United States Patent [19]
Yang et al.

[11] Patent Number: 5,880,225
[45] Date of Patent: Mar. 9, 1999

[54] PROCESS FOR MAKING POLYETHERESTER RESINS HAVING HIGH AROMATIC DIESTER

[75] Inventors: Lau S. Yang, Wilimington, Del.; Gangfeng Cai, Westh Chester; Diandre Armstead, Philadelphia, both of Pa.

[73] Assignee: Arco Chemical Technology, L.P., Greenville, Del.

[21] Appl. No.: 116,112

[22] Filed: Jul. 15, 1998

Related U.S. Application Data

[63] Continuation-in-part of Ser. No. 25,608, Feb. 18, 1998.

[51] Int. Cl.$^6$ ..................................................... C08F 20/00
[52] U.S. Cl. ........................ 525/440; 528/272; 528/301; 528/302; 528/308; 528/308.6; 525/437; 525/444; 525/454
[58] Field of Search ..................................... 528/272, 301, 528/302, 308, 308.6; 525/437, 440, 444, 454

[56] References Cited

U.S. PATENT DOCUMENTS

| | | | |
|---|---|---|---|
| 4,381,379 | 4/1983 | Toga et al. | 525/444 |
| 4,396,746 | 8/1983 | Toga | 525/444 |
| 4,415,727 | 11/1983 | Toga et al. | 528/272 |
| 4,436,896 | 3/1984 | Okamoto et al. | 156/332 |
| 5,254,723 | 10/1993 | Yang et al. | 560/240 |
| 5,319,006 | 6/1994 | Yang et al. | 523/500 |
| 5,378,796 | 1/1995 | George et al. | 528/279 |
| 5,380,816 | 1/1995 | Sullivan | 427/385 |
| 5,436,313 | 7/1995 | Klang et al. | 528/274 |
| 5,436,314 | 7/1995 | Yang et al. | 528/274 |
| 5,612,444 | 3/1997 | Cai et al. | 528/274 |
| 5,677,396 | 10/1997 | Klang | 525/445 |

FOREIGN PATENT DOCUMENTS

S59-55853  3/1984  Japan .

OTHER PUBLICATIONS

Jeffrey Selley, "Unsaturated Polyesters", *Encyclopedia of Polymer Science and Engineering*, 2nd Ed., 12, pp. 256–291.

Primary Examiner—Samuel A. Acquah
Attorney, Agent, or Firm—Jonathan L. Schuchardt

[57] ABSTRACT

A process for making polyetherester resins is disclosed. A glycol ester of an aromatic diacid such as terephthalic acid is reacted with a polyether and a source of a dicarboxylic acid such as maleic anhydride to produce a polyetherester resin, wherein the aromatic diester content may be conveniently adjusted as desired. The process permits the preparation of unsaturated polyetherester resins with relatively high levels of terephthalate repeating units while avoiding the difficulties associated with the direct use of terephthalic acid in previously known procedures. Such unsaturated polyetheresters are useful for making thermoset resins with excellent mechanical and physical properties. New glycol esters based on 2-methyl-1,3-propanediol, and polyester resins and thermosets made from the glycol esters, are also disclosed.

14 Claims, No Drawings

PROCESS FOR MAKING POLYETHERESTER RESINS HAVING HIGH AROMATIC DIESTER

CROSS-REFERENCE TO RELATED APPLICATION

This application is a continuation-in-part of copending application Ser. No. 09/025,608, filed Feb. 18, 1998 allowed.

FIELD OF THE INVENTION

This invention relates to a process for making polyetheresters. In particular, the invention is a process for making polyetheresters that have a high content of aromatic diester repeating units. The invention also includes glycol ester compositions that are reaction products of 2-methyl-1,3-propanediol and phthalic acid derivatives, as well as polyurethanes, polyester resins, and polyester thermosets made from the glycol esters.

BACKGROUND OF THE INVENTION

Recently, a new process for making polyetherester resins from polyethers was described in U.S. Pat. No. 5,319,006. The process reacts a polyether with a cyclic anhydride such as maleic anhydride in the presence of a Lewis acid catalyst. While it is unclear precisely what chemical mechanism is occurring, the net effect of the reaction is to insert the anhydride randomly into carbon-oxygen bonds of the polyether to generate ester groups in the resulting polyetherester resin. The polyetherester resin may then be combined with a vinyl monomer such as styrene and cured to provide a polyetherester thermoset.

Later, it was discovered that strong protic acids (i.e., acids having a pKa less than 0) and metal salts thereof will also catalyze this type of insertion reaction (see U.S. Pat. No. 5,436,313). Dicarboxylic acids may also be substituted in whole or in part for the anhydride (see U.S. Pat. No. 5,436,314).

The ability to prepare thermosettable polyetheresters by random "insertion" of anhydrides and carboxylic acids into polyethers provides a convenient way of making many unique polyetherester intermediates. These polyetheresters often have favorable performance characteristics compared with polyesters made by conventional esterification processes. Unfortunately, the "insertion" process does not work particularly well with high melting aromatic dicarboxylic acids such as isophthalic and terephthalic acids. Such acids have limited solubility or miscibility in the polyether-containing reaction mixture, even at the relatively high reaction temperatures typically employed. Aromatic dicarboxylic acids are commonly formulated into conventional unsaturated polyester resins to impart good mechanical properties and chemical resistance to thermosets made from the resin.

A two step process for making polyetheresters having a high content of aromatic ester recurring units is described in U.S. Pat. No. 5,612,444. In the first step, a low molecular weight polyether polyol is reacted with an aromatic dicarboxylic acid to produce a polyester intermediate. In the second step, the polyester intermediate is reacted with an anhydride or aliphatic dicarboxylic acid in the presence of a catalyst effective to promote random insertion of the anhydride or dicarboxylic acid into polyether segments of the polyester intermediate. While this two step process has proven to be quite useful, particularly for the preparation of polyetherester resins containing relatively high levels of isophthalic acid, it does have certain limitations. In particular, the incorporation of relatively large proportions of recurring units derived from terephthalic acid is still quite difficult due to the much higher melting point of terephthalic acid as compared to other aromatic dicarboxylic acids such as isophthalic acid. Thus, it would be extremely desirable to develop new polyetherester processes which would facilitate the inclusion of terephthalic acid at high levels in order to further enhance the performance of the polyetherester in thermoset formulations.

New ways to make unsaturated polyester resins (UPR) are also needed. In particular, the industry would benefit from efficient ways to incorporate high-melting aromatic dicarboxylic acids such as terephthalic acid into UPR. Although terephthalic acid is relatively inexpensive and offers resins good water resistance, it is seldom used to make UPR because of its high melting point and poor solubility in organic materials. The industry also needs ways to reduce cycle times in making UPR. Typical commercial resins often require 20 to 24-hour cycle times, which severely limits productivity. Finally, ways to make water-resistant polyester thermosets—ones that retain a high proportion of their tensile and flexural properties even after exposure to harsh aqueous media—are needed.

SUMMARY OF THE INVENTION

This invention provides a method of making a polyetherester resin comprised of aromatic diester repeating units comprising reacting a glycol ester of an aromatic diacid, a polyether and a dicarboxylic acid source at a temperature and in the presence of a catalyst effective to accomplish insertion of the aromatic diacid and the dicarboxylic acid source into the polyether to form the polyetherester resin.

In a preferred embodiment, the invention provides a method of making an unsaturated polyetherester resin comprised of terephthalate repeating units comprising reacting a 2-methyl-1,3-propanediol ester of terephthalic acid, a polyether polyol having an average hydroxyl functionality of from 2 to 6 and a number average molecular weight of from 400 to 12,000, and an unsaturated cyclic anhydride at a temperature and in the presence of a protic acid catalyst having a pKa of less than 0 effective to accomplish insertion of the terephthalic acid and unsaturated cyclic anhydride into the polyether polyol to form the unsaturated polyetherester resin.

The glycol ester of the aromatic diacid may be advantageously obtained by digesting polyethylene terephthalate (recovered from a waste or recycle stream, for example) with the glycol. Alternatively, the glycol ester may be produced by transesterification of glycol and an alkyl ester of terephthalic acid.

Finally, the invention includes glycol ester compositions prepared by reacting 2-methyl-1,3-propanediol and phthalic acid derivatives. These glycol esters offer many benefits for polyester resins and polyurethanes, including low cost, fast incorporation into polyester resins, and excellent performance, particularly in the area of water resistance.

DETAILED DESCRIPTION OF THE INVENTION

In the process of the invention, a glycol ester of an aromatic diacid, a polyether and a dicarboxylic acid source are reacted. Suitable aromatic diacids are those commonly used in the polyester industry and are typically high melting solids. Examples include phthalic acid, isophthalic acid, terephthalic acid, halogenated derivatives of these, and mixtures thereof. The process of this invention is particularly well-suited for the synthesis of polyetheresters containing terephthalate ester repeating units (i.e., repeating units derived from terephthalic acid).

The aromatic diacid is derivatized with a glycol to form the glycol ester. Glycols are dihydric alcohols (i.e., organic compounds containing two hydroxy groups). The use of $C_3$ to $C_{10}$ glycols, aliphatic glycols, linear unsubstituted glycols containing an odd number of carbon atoms, and/or branched glycols is particularly preferred in this invention, since these types of glycols have been found to be especially effective in rendering the aromatic diacid more soluble or miscible in the mixture of reactants and/or lowering the melting point of the aromatic diacid. An example of an especially preferred glycol for such purpose is 2-methyl-1,3-propanediol. Other suitable glycols for esterification of the aromatic diacid include, but are not limited to, propylene glycol, neopentyl glycol, 1,3-propanediol, 1,4-butanediol, 1,3-butanediol, ethylene glycol, and the like. Mixtures of different glycols may be utilized. Glycol esters of carboxylic acids other than aromatic diacids may be used in combination with the aromatic diacid glycol esters, if so desired.

Each aromatic diacid molecule is desirably substituted with approximately two molecules of glycol, although some proportion of the carboxylic acid groups of the aromatic diacid may be in free acid form or be substituted with a group other than a glycol (e.g., an alkyl group). The resulting glycol ester thus will generally contain an "internal" aromatic diester group

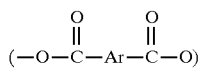

derived from the aromatic diacid, with terminal hydroxy-substituted hydrocarbyl units (—R—OH) derived from the glycol attached thereto through ester groups.

One convenient and inexpensive source of the glycol ester of the aromatic diacid is to digest (depolymerize) polyethylene terephthalate with the desired glycol or mixture of glycols. The polyethylene terephthalate may be virgin resin or may advantageously be recycled or waste material. The digestion (which may also be considered a glycolysis reaction) may be carried out in any manner known in the art. For example, the polyethylene terephthalate may be reacted with 0.7 to 1.3 equivalents of the desired glycol at a temperature of 150° C. to 250° C. in the presence of an effective amount of a suitable transesterification catalyst such as zinc acetate. The digestion need not be continued any longer than the minimum time necessary to completely liquefy the polyethylene terephthalate or render it miscible when combined with the other reactants used in the present process for making polyetherester resins.

An alternative procedure for preparing the glycol ester of the aromatic diacid is to react a dialkyl diester of the aromatic diacid with the glycol or mixture of glycols under conditions effective to accomplish transesterification. The alkyl groups on the dialkyl diester are preferably relatively short chain (i.e., $C_1$–$C_4$) alkyl groups so that the aliphatic alcohol generated during transesterification may be readily separated from the desired glycol ester by distillation or other suitable means. Conditions and catalysts effective for accomplishing transesterifications of this type are well-known in the art. The glycol ester of the aromatic diacid may also be obtained by direct esterification of the aromatic diacid with the glycol, using conventional procedures.

The invention includes glycol ester compositions that are reaction products of 2-methyl-1,3-propanediol and phthalic acid derivatives. The compositions, which have essentially no acid functional groups, are made by reacting phthalic acid derivatives (e.g., terephthalic acid, isophthalic acid, phthalic anhydride, dimethyl terephthalate, or the like) with at least about 1.5 molar equivalents of 2-methyl-1,3-propanediol. The new compositions offer surprising and valuable advantages for making polyester resins and polyurethanes.

Compositions of the invention include mixtures comprising 2-methyl-1,3-propanediol and one or more glycol esters of the formula:

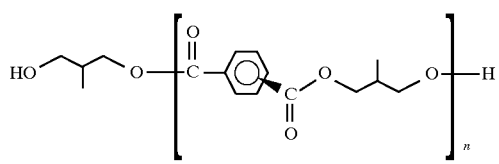

in which n has a value from 1 to 6. Preferred compositions comprise from about 0.5 to about 50 wt. % of 2-methyl-1,3-propanediol and from about 50 to about 99 wt. % of the glycol esters. More preferred compositions comprise from about 5 to about 15 wt. % of 2-methyl-1,3-propanediol, from about 30 to about 50 wt. % of glycol ester in which n=1, and from about 40 to about 60 wt. % of glycol ester in which n=2 to 6.

The invention also includes new glycol esters selected from the group consisting of bis(3-hydroxy-2-methylpropyl) terephthalate and bis(3-hydroxy-2-methylpropyl) isophthalate.

While the glycol ester compositions of the invention can be made by any suitable method, a preferred process comprises heating a phthalic acid derivative with at least about 1.5, more preferably at least about 2, molar equivalents of 2-methyl-1,3-propanediol and optionally, an esterification catalyst, at a temperature within the range of about 100° C. to about 300° C., preferably from about 150° C. to about 250° C. Any water or alcohol by-products are removed as the reaction proceeds to produce a mixture comprising the glycol ester. Normally, the mixture includes some unreacted 2-methyl-1,3-propanediol. While any desired esterification catalyst can be used, we found that the use of an organotin oxide catalyst, such as butyltin oxide, is particularly valuable for reducing the reaction time needed to synthesize the glycol ester; typical reaction times are as short as 2 or 3 hours. Another advantage of using the organotin oxide is low-color glycol esters. Examples 17–20 below illustrate the preparation of glycol esters of the invention.

We surprisingly found that the glycol esters described in the preceding four paragraphs offer valuable advantages, not only for making polyetherester resins by insertion, but also for preparing saturated or unsaturated polyester resins (UPR) and polyurethanes. First, the glycol esters and/or mixtures with 2-methyl-1,3-propanediol are generally easy-to-use liquids with good solubility in organic materials. In contrast, the phthalic acid derivatives used to make the glycol ester mixtures are normally solids. Terephthalic acid, for example, is particularly troublesome to use because it has a high melting point and poor solubility in organics at ordinary temperatures. For this reason alone, terephthalic acid, although traditionally an inexpensive starting material, is not used commercially for making unsaturated polyester resins, which have relatively low molecular weight. Instead, it is used primarily for making high-molecular-weight thermoplastic materials (see, e.g., U.S. Pat. Nos. 4,396,746 or 4,381,379).

A second key process advantage of the glycol esters of the invention is that they enable formulators, for the first time, to efficiently make low-molecular-weight saturated and unsaturated polyester resins from terephthalic acid. Use of the glycol ester, which has only primary hydroxyl groups, reduces the cycle time for making unsaturated polyester resins by as much as 80% compared with traditional resins, which normally use diols that contain secondary hydroxyl groups (e.g., propylene glycol). See especially Table IV (below), which shows the advantage of glycol esters of the invention in reducing the cycle time needed to make an unsaturated polyester resin.

By preparing the glycol ester in a separate reactor, resin formulators can also free up a large volume of reactor space for making polyester resins with much-improved efficiency. The polyester resins are made by substituting some or all of the traditional diol component with the glycol esters of the invention, and performing a condensation polymerization reaction with conventional carboxylic acid derivatives (maleic anhydride, phthalic anhydride, isophthalic acid, etc.) as is well known in the art.

In one preferred process for making unsaturated polyester resins using the glycol esters of the invention, a "diol diester" is first made by reacting a diol (propylene glycol, 2-methyl-1,3-propanediol, etc.) with at least about 2 molar equivalents of a cyclic anhydride (e.g., maleic anhydride). This material has carboxylic acid terminal groups. The diol diester is then heated with a glycol ester composition of the invention, optionally in the presence of additional 2-methyl-1,3-propanediol, at a temperature within the range of about 100° C. to about 300° C. while removing water of reaction. The product is an unsaturated polyester resin having a relatively high content of fumarate ester recurring units—at least about 80 mole %, more preferably at least about 85 mole %, as measured by $^{13}$C NMR spectroscopy. In a more preferred process, the diol diester has the formula: R—(—$O_2C$—R'—$CO_2H$)$_2$ in which R is a bivalent $C_2$–$C_{30}$ alkyl or aralkyl moiety derived from the diol, and R' is a bivalent $C_2$–$C_{20}$ alkyl or aryl moiety derived from the cyclic anhydride. Other suitable diol diesters and their methods of preparation are disclosed in U.S. Pat. No. 5,677,396, the teachings of which are incorporated herein by reference.

In addition to the process improvements, glycol ester compositions of the invention offer performance advantages. Unsaturated polyester resins made using the glycol esters have low viscosities (see Tables IV and V) and low color resulting from reduced exposure to elevated reaction temperature during preparation. In addition, the resins give thermoset products with excellent resistance to aqueous solutions—as good or better than commercial high-performance, corrosion-grade products based on isophthalic acid. As Table V shows, unsaturated polyester resins made from the glycol esters have an excellent overall balance of physical properties, and they retain a high percentage of flexural strength and flexural modulus even after exposure to boiling aqueous media (water, 5% aq. HCl, or 5% aq. KOH) for seven days. In contrast, as Comparative Example 32 demonstrates, typical unsaturated polyester resins based on diethylene glycol and terephthalic acid deteriorate unacceptably under the same conditions. A further improvement in water resistance can be achieved by making unsaturated polyester resins with high fumarate content as discussed above (see also Examples 24–25).

The glycol esters are also valuable as chain extenders for polyurethanes. They react with di- or polyisocyanates or NCO-terminated prepolymers to give a variety of polyurethane products, including, e.g., coatings, elastomers, and sealants.

In addition to the glycol ester of the aromatic diacid, the method of the invention requires a polyether. Polyethers suitable for use in the invention are those derived from catalyzed ring-opening polymerization of cyclic ethers such as epoxides, oxetanes, oxolanes, and the like. The polyethers have repeat units of oxyalkylene groups (—O—A—) in which A has from 2 to 10 carbon atoms, preferably from 2 to 4 carbon atoms. The presence of oxypropylene groups, either exclusively or in combination with other types of oxyalkylene groups, is especially preferred. The polyethers can have different end groups, depending upon how the polyethers are made or modified. For example, the polyether can have hydroxyl, ester, ether, acid, olefinic, or amino end groups, or the like or combinations of these. Mixtures of different types of polyethers can be used.

Preferred polyethers for the process of the invention are polyether polyols (i.e., polyethers having hydroxyl end groups). Suitable polyether polyols include, for example, polyoxypropylene polyols, polyoxyethylene polyols, ethylene oxide-propylene oxide copolymers, polytetramethylene ether glycols, oxetane polyols, and polymers of tetrahydrofuran and epoxides. Typically, these polyols will have average hydroxyl functionalities from about 2 to about 6, and number average molecular weights from about 400 to about 12,000. The polyether polyols can be recycled polyols derived from a polyurethane foam, elastomer, sealant, or the like.

The dicarboxylic acid source used in the process of this invention may be utilized as a means of introducing repeating units of dicarboxylic acids other than the aromatic diacid or diacids which are esterified with the glycol. For example, the dicarboxylic acid source may be an aliphatic dicarboxylic acid or equivalent thereof such as an anhydride. The dicarboxylic acid source may also be an aromatic diacid such as isophthalic acid, phthalic acid or terephthalic acid or an equivalent thereof such as an anhydride or ester. Preferably, however, the dicarboxylic acid source is based on an acid other than a aromatic diacid since, as noted earlier, there are limits to how much aromatic diacid can be introduced into the polyetherester resin directly in such manner because of solubility and melting point considerations.

Preferred for use as the dicarboxylic acid source are linear, branched and cyclic $C_3$–$C_{40}$ aliphatic dicarboxylic acids and anhydrides thereof, including both saturated and unsaturated species. Examples of particularly preferred dicarboxylic acid sources include maleic acid, fumaric acid, glutaric acid, succinic acid, malonic acid, pimelic acid, citraconic acid, itaconic acid, suberic acid, tetrahydrophthalic acid, maleic anhydride, succinic anhydride, itaconic anhydride, citraconic anhydride, tetrahydrophthalic anhydride, and the like. Where unsaturated polyetheresters are desired, the use of maleic acid and/or maleic anhydride is especially desirable.

The glycol ester of the aromatic diacid, the polyether and the dicarboxylic acid source react in the presence of a catalyst that promotes insertion of the aromatic diacid and dicarboxylic acid into the polyether (an "insertion catalyst"). Suitable insertion catalysts include Lewis acids, protic acids that have a pKa less than about 0, and metal salts of the protic acids. The insertion catalyst is used in an amount effective to promote insertion into polyether carbon-oxygen bonds.

In one convenient embodiment of the invention, the glycol ester, the polyether and the dicarboxylic acid source are simply combined in a suitable reaction vessel and heated. In other embodiments of the invention, however, two of the reactants may be prereacted prior to reaction with the third reactant. For example, the glycol ester and the dicarboxylic acid source may be first reacted to derivatize the hydroxyl groups of the glycol ester with the dicarboxylic acid source. A glycol ester having the general structure glycol-terephthalic acid-glycol, for instance, may be reacted with maleic anhydride to form an oligomeric species having the general structure maleic acid-glycol-terephthalic acid-glycol-maleic acid, which may thereafter be "inserted" into the polyether in accordance with the process described herein. As will be recognized by those skilled in the art, the aforementioned oligomeric species may be inserted intact into the polyether or may undergo interesterification and/or transesterification with other components of the reaction mixture such that the individual repeating units of the oligomeric species become disassociated from each other in the course of the insertion process. Where the dicarboxylic acid source is an anhydride, the reaction with the glycol ester is generally quite facile and can typically be accomplished at mild temperatures in the absence of any catalyst. If the dicarboxylic acid source is in free acid form, however, higher temperatures and/or an esterification catalyst may be needed. Removal of the water generated by esterification of the glycol ester with the free acid may also be desirable.

Preferred Lewis acids are metal halides of the formula $MX_n$, wherein M is a metal having an oxidation number from 2 to 4, X is a halogen, and n is an integer from 2 to 4. Examples of suitable Lewis acids are zinc chloride, zinc bromide, stannous chloride, stannous bromide, aluminum chloride, ferric chloride, boron trifluoride, and the like, and mixtures thereof. Most preferred are zinc chloride and zinc bromide. When a Lewis acid catalyst is used, it is preferred to use an amount within the range of about 0.01 to about 5 wt. % based on the amount of polyester intermediate. Additional examples of suitable Lewis acids are found in U.S. Pat. No. 5,319,006, the teachings of which are incorporated herein by reference.

Protic acids (organic and inorganic) that have a pKa less than about 0 are also useful as insertion catalysts. Generally, the acids will be stronger than organic carboxylic acids. Suitable acids include sulfonic acids such as arylsulfonic acids, alkylsulfonic acids, and halogenated alkyl- and aryl-sulfonic acids. Also suitable are hydrogen halides, halosulfonic acids, tetrafluoroboric acid, heteropolyacids, and sulfuric acid. Mixtures of different acids can be used. Examples include p-toluenesulfonic acid, trifluoromethanesulfonic acid (triflic acid), trichloromethanesulfonic acid, hydrochloric acid, phosphotungstic acid, and the like. Preferred protic acids are sulfuric acid, p-toluenesulfonic acid, and phosphotungstic acid. When a protic acid is used as the catalyst, it is generally preferred to use an amount within the range of about 0.01 to about 1 wt. % based on the amount of polyester intermediate. A more preferred range is from about 0.01 to about 0.3 wt. %. Additional examples of suitable protic acids are found in U.S. Pat. No. 5,436,313, the teachings of which are incorporated herein by reference. Metal salts derived from protic acids that have a pKa less than about 0 are also effective insertion catalysts. Preferred salts are metal salts of arylsulfonic acids, alkylsulfonic acids, halogenated aryl- and alkylsulfonic acids, tetrafluoroboric acid, sulfuric acid, heteropolyacids, and halosulfonic acids. Sulfonic acid salts, especially triflate salts, are particularly preferred. Preferably, the metal is selected from Group IA, IIA, IIB, IB, IIIA, IVA, VA, and VIII. Thus, the metal can be, for example, lithium, potassium, magnesium, zinc, copper, aluminum, tin, antimony, iron, nickel. Examples of suitable metal salts are lithium triflate, sodium triflate, magnesium triflate, zinc triflate, copper(II) triflate, zinc tetrafluoroborate, zinc p-toluenesulfonate, aluminum triflate, iron(II) tetrafluoroborate, tin(II) triflate, and the like, and mixtures thereof. When a metal salt is used as the catalyst, it is preferably used in an amount within the range of about 1 part per million ($10^{-4}$ wt. %) to about 1 wt. % based on the amount of polyether. A more preferred range is from about 0.01 wt. % to about 0.3 wt. %. Additional examples of suitable metal salts of protic acids are found in U.S. Pat. No. 5,436,313, the teachings of which are incorporated herein by reference.

The reaction temperature is preferably within the range of about 80° C. to about 250° C.; a more preferred range is from about 100° C. to about 220° C. Most preferably, the reaction temperature is maintained between about 150° C. to 200° C. The reaction is normally complete within about 4–12 h at temperatures within the preferred temperature ranges. The progress of the reaction can be followed by measuring the acid number, which will decrease and level off as the reaction proceeds. Without wishing to be bound by theory, it is believed that the hydroxy groups of the glycol ester react with the dicarboxylic acid source such that said hydroxy groups are thereby esterified with one of the two carboxylic acid groups (or equivalent thereof) in the dicarboxylic acid source. The other carboxylic acid group derived from the dicarboxylic acid source participates in the reaction which leads to insertion into the polyether component.

The polyetherester resin contains diester repeating units (derived from the aromatic diacid introduced by means of its glycol ester as well from the dicarboxylic acid source), oxyalkylene repeating units (derived from the glycol component in the glycol ester of the aromatic diacid), and recurring polyether "blocks" (derived from the polyether; typically, each such block will contain, on average, from about 3 to 6 oxyalkylene (e.g., oxyethylene, oxypropylene) repeating units). Where the polyetherester resin is an unsaturated resin to be used as a component in the preparation of a thermoset which also contains a vinyl monomer such as styrene, it is preferred that the ether/ester mole ratio be at least about 0.5. Such resins generally will have number average molecular weights within the range of about 500 to about 10,000.

The relative amounts of glycol ester, polyether, and dicarboxylic acid source employed may be varied within quite wide limits and may be readily adjusted as needed to provide a polyetherester resin having the desired aromatic diacid content, ether/ester molar ratio, unsaturation level, molecular weight and so forth. Typically, however, the process of the present invention will utilize 20 to 70 weight percent polyether, 10 to 50 weight percent dicarboxylic acid source and 5 to 60 weight percent glycol ester (where the total amount of polyether, dicarboxylic acid source, and glycol ester is equal to 100 percent).

The process of the invention is conveniently performed by combining the glycol ester, the polyether, the dicarboxylic acid source, and the catalyst in any desired order or manner. The process can be performed batchwise, semi-batchwise or continuously as desired. It is preferred to perform the process under an inert atmosphere of nitrogen, argon or the like. Preferably, the mixture of reactants is well agitated.

If so desired, the temperature and pressure within the reactor may be manipulated such that all or a portion of the lighter components of the reaction mixture which may form during the insertion process such as water, dimers and trimers of glycols (e.g., dipropylene glycol, tripropylene glycol), acetals, aldehydes and the like may be removed as an overhead stream from the reaction mixture.

The resulting product is a polyetherester resin that preferably contains at least about 10 wt. % of recurring units derived from the aromatic diacid. The polyetherester resin may contain much higher levels of recurring units derived from the aromatic diacid, however, if so desired. The optimum level of aromatic diester repeating units will depend upon the end use application. The process of this invention permits the convenient preparation of polyetherester resins over an exceptionally broad composition range.

Heating is typically continued until a polyetherester resin that has an acid number within the range of about 75 to about 200 mg KOH/g is produced; a more preferred range is from about 90 to about 150 mg KOH/g; most preferred is the range from about 110 to about 130 mg KOH/g.

The polyetherester resin prepared as described above commonly has a large proportion of carboxylic acid end groups. In some embodiments, the resin will be essentially free of hydroxyl end groups. This resin can be used "as is" to make a polyetherester thermoset. Preferably, it is modified in one of two ways before using it to make a polyetherester thermoset or polyurethane. One way to modify the resin is to continue heating it to further react the polymer and reduce its acid number, preferably to about 60 mg KOH/g or less. This method is generally the less desirable of the two because excessive heating and prolonged reaction times are needed to achieve a resin having a low enough acid number. The second and more preferred method, which is described further below, is to reduce the acid number by heating the polyetherester resin in the presence of a glycol.

The initially obtained polyetherester resin having an acid number within the range of about 75 to about 200 mg KOH/g is preferably heated with a glycol to produce a glycol-capped polyetherester resin that has a reduced acid number. Suitable glycols generally will have molecular weights less than about 200. Suitable glycols include, for example, propylene glycol, ethylene glycol, diethylene glycol, dipropylene glycol, tripropylene glycol, 1,4-butanediol, 1,3-propanediol, 2-methyl-1,3-propanediol, neopentyl glycol, and the like, and mixtures thereof. Particularly preferred are propylene glycol, neopentyl glycol, and 2-methyl-1,3-propanediol.

The amount of glycol used is preferably at least about 1 equivalent of glycol for each residual carboxylic acid end group. Typically, this amounts to heating the polyetherester resin with at least about 5–20 wt. % of the glycol. The glycol is typically heated with the polyetherester resin at the same temperature as that used for the insertion reaction until the acid number of the glycol-capped polyetherester resin drops to the desired level. Any excess glycol is removed by stripping.

The polyetherester resin is preferably heated in the presence of the glycol to produce a glycol-capped polyetherester resin that has an acid number within the range of about 10 to about 90 mg KOH/g; a more preferred range is from about 15 to about 50 mg KOH/g.

Polyetherester resins and glycol-capped polyetherester resins of the invention that contain some ethylenic unsaturation are useful for preparing polyetherester thermosets. The thermoset is made by reacting the unsaturated resin with a vinyl monomer in the presence of a free-radical initiator under conditions effective to produce a polyetherester thermoset. The techniques are essentially the same as those used in the polyester industry to prepare unsaturated polyester thermosets from unsaturated polyester resins.

Preferred vinyl monomers are vinyl aromatic monomers, acrylates, methacrylates, and allyl esters. Suitable vinyl monomers include, for example, styrene, methyl methacrylate, methyl acrylate, diallyl phthalate, divinylbenzene, α-methylstyrene, and the like, and mixtures thereof. Styrene is particularly preferred.

The polyetherester resins are often blended with a vinyl monomer (typically styrene) and an inhibitor such as hydroquinone, tert-butylcatechol, or the like, or mixtures thereof, and the solution is stored until needed.

The polyetherester resin solution can be used to make a clear casting by combining it with a free-radical initiator, preferably a peroxide such as benzoyl peroxide, tert-butylperbenzoate, or the like, pouring the mixture into a mold, and heating it to effect a cure. If desired, other additives can be included in the thermosets, including, for example, fillers, pigments, chopped glass, glass mat, low-profile additives, flame retardants, and the like.

The following examples illustrate the invention. Those skilled in the art will recognize many variations that are within the spirit of the invention and scope of the claims.

EXAMPLES

Examples 1–5 and Comparative Example 6

Examples 1–5 demonstrate the process of the invention using polyethylene terephthalate as the aromatic diacid glycol ester component. In each example, the polyethylene terephthalate was first digested with one equivalent of 2-methyl-1,3-propanediol at 190° C. to 220° C. in the presence of about 100 to 500 ppm zinc acetate as a catalyst. Once the polyethylene terephthalate had been completely liquefied, maleic anhydride, polyether polyol (3000 number average molecular weight propoxylated glycerin) and p-toluene sulfonic acid catalyst (700–1000 ppm) were added and the reaction mixture heated at 190° C. for several hours until an acid number of between 60 and 120 was reached. The reaction product was then capped with additional 2-methyl-1,3-propanediol to lower the acid number further to between 30 and 50. Thereafter, the unsaturated polyetherester resin is cooled to 120° C. and blended with styrene (40%) to provide a resin solution suitable for curing with an appropriate free radical initiator. The aforedescribed procedure in each case took about 20 hours to complete.

To cure the polyetherester resin solution to a thermoset for measurement of mechanical properties, the resin solution was combined with 0.25 weight percent of a 6 weight percent cobalt naphthenate solution in mineral oil and 1.5 weight percent of a 9 weight percent methyl ethyl ketone peroxide solution (available as "DDM-9" from Atochem). The resulting mixture was poured into a glass mold and kept at room temperature overnight. The hardened plates were postcured in an air oven at 100° C. for 5 hours. Samples were then cut and tested according to the corresponding ASTM methods listed in Table I.

Increasing the proportion of polyethylene terephthalate while holding the maleic anhydride content constant at 25 weight percent resulted in significant improvement in tensile strength, flexural strength and heat resistance (as measured by DTUL). Comparative Example 6, which was prepared in the absence of any polyethylene terephthalate or derivative thereof, exhibited much poorer physical properties.

TABLE I

| Example | 1 | 2 | 3 | 4 | 5 | 6* |
|---|---|---|---|---|---|---|
| Maleic Anhydride, wt. % | 25 | 25 | 25 | 25 | 25 | 25 |
| PET, wt. % | 15 | 20 | 25 | 30 | 35 | 0 |
| Polyether Polyol, wt. % | 49 | 45 | 35 | 31 | 29 | 63 |
| Tensile Strength, psi (ASTM D-638) | 6200 | 7200 | 8200 | 9400 | 10,500 | 5000 |
| Tensile Elongation, % | 6.5 | 4.5 | 4.0 | 3.8 | 3.9 | 2.0 |
| Flex Strength, psi (ASTM D-790) | 10,900 | 12,500 | 15,500 | 16,800 | 19,000 | 9000 |
| DTUL, °F. (ASTM D-648) | 141 | 156 | 170 | 185 | 190 | 100 |

*Comparative

Examples 7–9

These examples demonstrate the effect on the physical properties of a cured resin of keeping the polyethylene terephthalic content constant and varying the maleic anhydride content of a polyetherester resin prepared in accordance with the invention. The synthetic procedure employed in Examples 1–5 was employed, except that the polyether polyol used was a 6000 number average molecular weight propoxylated glycerin. As Table II shows, increasing the maleic anhydride content of the polyetherester resin improves tensile strength, flexural strength and heat resistance.

TABLE II

| Example | 7 | 8 | 9 |
|---|---|---|---|
| Maleic Anhydride, wt. % | 20 | 25 | 30 |
| PET, wt. % | 30 | 30 | 30 |
| Polyether Polyol, wt. % | 35 | 30 | 23 |
| Tensile Strength, psi (ASTM D-638) | 8300 | 8600 | 9000 |
| Tensile Elongation, % | 3 | 2.7 | 2.5 |
| Flex Strength, psi (ASTM D-790) | 14,200 | 15,600 | 16,000 |
| DTUL, °F. (ASTM D-648) | 168 | 199 | 245 |

Examples 10–16

These examples illustrate the embodiment of the invention wherein the glycol ester of terephthalic acid is obtained by transesterification of the dimethylester of terephthalic acid with 2-methyl-1,3-propanediol. A 4 liter reactor equipped with a Dean Stark trap was charged with 350 g dimethyl terephthalate, 400 g 2-methyl 1,3-propanediol and 0.15 g zinc acetate. The contents of the reactor were heated. Methanol began to collect in the trap at about 160° C.; heating was continued until methanol evolution stopped at about 220° C. A total of 115 g methanol was collected. The mixture was cooled to 150° C., then 525 g maleic anhydride, 2200 g of a 2000 molecular weight polypropylene glycol, and 3.5 g p-toluene sulfonic acid were added and the mixture heated at 195° C. until the acid number dropped to 90 mg KOH/g. An additional 170 g 2-methyl-1,3-propanediol was added and heating continued until a final acid number of about 30 mg KOH/g was achieved. The mixture was cooled to 120° C. and blended with styrene to give a polyetherester resin solution. Small amounts of stabilizers such as hydroquinone (100 ppm) and t-butyl hydroquinone (100 ppm) were also added to improve the storage stability of the solution. Table III shows the effect of varying the proportions of the reactants on the physical properties of a thermoset prepared from the polyetherester resin.

TABLE III

| Example | 10 | 11 | 12 | 13 | 14 | 15 | 16 |
|---|---|---|---|---|---|---|---|
| Maleic Anhydride, wt. % | 15 | 15 | 15 | 25 | 25 | 25 | 22 |
| Dimethyl Terephthalate, wt. % | 10 | 15 | 33 | 15 | 20 | 25 | 30 |
| Polyether Polyols, wt. 5 | 63 | 56 | 31 | 41 | 33 | 30 | 24 |
| Tensile Strength, psi (ASTM D-638) | 720 | 1200 | 5000 | 5500 | 6900 | 8600 | 8500 |
| Tensile Elongation, % | 35 | 30 | 12.5 | 5.3 | 5.1 | 4.9 | 2.6 |
| Flex Strength, psi (ASTM D-790) | | | 11,200 | 10,500 | 12,500 | 16,000 | 18,800 |
| DTUL, °F. (ASTM D-648) | | | 117 | 146 | 152 | 176 | 170 |

Example 17

Preparation of a Glycol Ester Mixture from 2-Methyl-1,3-Propanediol and Terephthalic Acid (3:1 mole ratio)

A twelve-liter glass reactor equipped with nitrogen inlet, mechanical stirrer, steam-jacketed reflux column, overhead adapter with thermometer, and water-cooled condenser is charged with 2-methyl-1,3-propanediol (5407 g, 60 mol) under a stream of nitrogen. The stirrer is started, and FasCat 4100 catalyst (butyltin hydroxide oxide hydrate, product of Atochem, 2.62 g, 300 ppm) is added. With the stirrer at high speed, terephthalic acid (3323 g, 20 mol) is charged to the reactor. The reaction mixture is heated to 210° C., and steam is introduced into the reflux column. Water begins to distill, and the overhead vapor temperature is maintained at 100° C. After about 2 h, the reaction mixture turns clear. Heating continues at 210° C., and the acid number is measured every 0.5 h after the initial 2 h heating period until it dips to less than 1.5 mg KOH/g (total reaction time: 6 h). About 720 g of water is collected. After cooling to 150° C., the mixture is drained from the reactor and characterized.

Gel permeation chromatography (GPC) analysis reveals a mixture that contains bis(3-hydroxy-2-methylpropyl) terephthalate (40 wt. %) as the major product. The mixture also contains 2-methyl-1,3-propanediol (10 wt. %), the glycol ester with two (n=2) terephthlate units (27 wt. %), and glycol esters with three or four terephthalate units (22 wt. %).

Example 18

Preparation of a Glycol Ester Mixture from 2-Methyl-1,3-Propanediol and Terephthalic Acid (2:1 mole ratio)

The procedure of Example 17 is generally followed, except that the molar ratio of 2-methyl-1,3-propanediol to terephthalic acid used is 2:1. Thus, 4506 g of 2-methyl-1,3-propanediol (50 mol) and 4153 g of terephthalic acid (25 mol) are used. The reaction mixture turns clear in about 3 h, and about 900 g of water is ultimately collected.

GPC analysis reveals a mixture that contains bis(3-hydroxy-2-methylpropyl)terephthalate (27 wt. %), 2-methyl-1,3-propanediol (5 wt. %), the glycol ester with two terephthlate units (25 wt. %), and glycol esters with three to six terephthalate units (43 wt. %).

Example 19
Preparation of a Glycol Ester Mixture from 2-Methyl-1,3-Propanediol and Isophthalic Acid (3:1 mole ratio)

The procedure of Example 17 is followed, except that isophthalic acid is used instead of terephthalic acid.

GPC analysis reveals a mixture that contains bis(3-hydroxy-2-methylpropyl)isophthalate (40 wt. %) as the major product. The mixture also contains 2-methyl-1,3-propanediol (10 wt. %), the glycol ester with two (n=2) terephthlate units (27 wt. %), and glycol esters with three or four terephthalate units (22 wt. %).

Example 20
Preparation of a Glycol Ester Mixture from 2-Methyl-1,3-Propanediol and Terephthalic acid/Isophthalic Acid (3:1 mole ratio)

The procedure of Example 17 is followed, except that a mixture of terephthalic acid and isophthalic acid (80 mole % terephthalic acid) is used instead of terephthalic acid only. GPC analysis reveals a similar product distribution compared with the one obtained in Example 17, except for the presence of isophthalate recurring units. In addition, the product is a clear liquid that remains so even after months of storage. In contrast, the product made from only terephthalic acid usually crystallizes and/or turns cloudy at room temperature.

Comparative Example 21
Preparation of Glycol Ester Mixtures—No Organotin Catalyst The procedure of Example 17 is followed, except that the organotin catalyst is omitted. The reaction requires 15 h. GPC analysis indicates a similar product compared with the one made in Example 17.

Example 22
Unsaturated Polyester Resin from Glycol Ester Mixtures

A glycol ester mixture is prepared as described in Example 17 from 2-methyl-1,3-propanediol (3248 g) and terephthalic acid (1997 g). The product glycol ester mixture (4812 g) is charged, along with maleic anhydride (2055 g), to a twelve-liter glass reactor equipped with nitrogen inlet, mechanical stirrer, steam-jacketed reflux column, overhead adapter with thermometer, and water-cooled condenser. The reaction mixture is heated to 210° C., and steam is introduced into the reflux column. Water begins to distill, and the overhead vapor temperature is maintained at 100° C. Heating continues at 210° C. for 5–6 h, and the acid number is measured every 0.5 h until it dips to a value within the range of about 10–30 mg KOH/g. After cooling to <160° C., hydroquinone (100 ppm) is added, and the resin is further cooled to 100°–120° C. The resin is blended with styrene (65 wt. % resin) containing t-butylcatechol (142 ppm) and methyl-t-butylhydroquinone (430 ppm), and the mixture is quickly chilled to room temperature with an ice-water bath. The final resin contains 35 wt. % styrene, 65 ppm hydroquinone, 50 ppm t-butylcatechol, and 150 ppm methyl-t-butylhydroquinone. Average cycle time for making the resin from the glycol ester: 7–10 h. Total cycle time needed to make the resin from glycol and diacid starting materials: 15 h (see Table IV).

Comparative Example 23
Unsaturated Polyester Resin from the Propylene Glycol Terediol The procedure of Example 17 is followed using propylene glycol and terephthalic acid (2:1 mole ratio) to make a glycol ester having mostly secondary hydroxyl end groups. This glycol ester is used to make an unsaturated polyester resin by the procedure of Example 22. The resulting resin has a viscosity of 1300 cps at 40 wt. % styrene. The cycle time for making the resin from the glycol ester: 20 h. Total cycle time to make the resin from glycol and diacid starting materials: 40 h (See Table IV).

TABLE IV

Resin and Thermoset Property Comparison

| Resin source | Example 22 | Comparative Example 23 | Commercial Isophthalate Resin |
|---|---|---|---|
| Type of resin | MPDiol, TA | PG, TA | PG, ISO |
| Viscosity, cps, at 40% styrene | 800 | 1300 | 2000 |
| Total cycle time*, h | 15 | 40 | 24 |
| Thermoset properties | | | |
| Tensile strength (psi) | 11,000 | 11,500 | 10,000 |
| Flexural strength (kpsi) | 22.0 | 17.3 | 22.5 |
| Elongation (%) | 4.0 | 2.4 | 2.0 |

MPDiol = 2-methyl-1,3-propanediol;
TA = terephthalic acid;
PG = propylene glycol;
ISO = isophthalic acid
*Total time needed to make the unsaturated polyester resin from glycol and diacid starting materials (includes time needed to make the glycol ester in Exs. 22 and C23).

Example 24
Unsaturated Polyester Resin from Glycol Ester Mixtures: High Fumarate Resin A three-liter glass reactor equipped as described in Example 17 is charged, under a stream of nitrogen, with 2-methyl-1,3-propanediol (216 g, 2.4 mol) and maleic anhydride (471 g, 4.8 mol). The mixture is heated at 195°–210° C. for 1.5 to 2 h with no steam in the reflux column to give 2-methyl-1,3-propanediol bismaleate. The reactor is then charged with 2-methyl-1,3-propanediol (115 g) and 497 g of a glycol ester made from 2-methyl-1,3-propanediol (1442 g) and terephthalic acid (1329 g) (2:1 molar ratio of diol to acid used to make the glycol ester).

The reaction mixture is heated to 210° C., and steam is introduced into the reflux column. Water begins to distill, and the overhead vapor temperature is maintained at 100° C. Heating continues at 210° C. for 5–10 h, and the acid number is measured every 0.5 h until it dips to a value within the range of about 10–30 mg KOH/g. After cooling to <160° C., hydroquinone (100 ppm) is added, and the resin is further cooled to 100°–120° C. The resin is blended with styrene (65 wt. % resin) containing t-butylcatechol (142 ppm) and methyl-t-butylhydroquinone (430 ppm), and the mixture is quickly chilled to room temperature with an ice-water bath. The final resin contains 35 wt. % styrene, 65 ppm hydroquinone, 50 ppm t-butylcatechol, and 150 ppm methyl-t-butylhydroquinone.

Analysis of the resin by $^{13}$C NMR indicates about 87.5 mole % fumarate content 4.5 h after adding the glycol ester. In contrast, a resin prepared as in Example 22 has only about 66 mole % fumarate content after heating for 5.5 h, and only about 78 mole % fumarate content after 12 h of heating. Resins with a high proportion of fumarate ester generally give thermosets with high DTUL and better water resistance.

Example 25
Unsaturated Polyester Resin from Glycol Ester Mixtures: High Fumarate Resin The procedure of Example 24 is followed, except that in the initial step, propylene glycol bismaleate is prepared instead of 2-methyl-1,3-propanediol bismaleate. Analysis of the resin by $^{13}$C NMR indicates about 92 mole % fumarate content 4.5 h after adding the glycol ester. This resin remains clear upon storage.

Example 26
Preparation of Thermoset Polymers from Unsaturated Polyester Resins (General Procedure)

A thermoset polymer is made by diluting an unsaturated polyester resin of the invention (made by the method of Examples 22, 24, or 25) to 40 wt. % styrene content, combining the resin solution with 0.2 wt. % of cobalt naphthenate solution (6% active cobalt), and 1.25 wt. % of DDM-9 initiator (MEK peroxide in mineral oil containing 9% active oxygen, product of Atochem), and allowing it to cure at room temperature for several hours. The resulting thermoset product is post-cured at 100° C. for 5 h. Results of physical testing appear in Table V.

Examples 27–29
Preparation of Unsaturated Polyester Resins and Evaluation in Thermosets Glycol esters derived from 2-methyl-1,3-propanediol and various phthalic acid derivatives are made by the procedure of Example 17. The resulting glycol ester mixtures are used to make unsaturated polyester resins by the procedure of Example 22. The procedure of Example 26 is used to make thermosets from the resins. Properties of the resins and thermosets appear in Table V.

As the table shows, unsaturated polyester resins made from the glycol esters exhibit an excellent overall balance of physical properties, including good water resistance.

Examples 30–31 and Comparative Example 32
Comparison with a Diethylene Glycol-Based Resin Glycol esters derived from terephthalic acid and 2-methyl-1,3-propanediol or diethylene glycol are prepared by the procedure of Example 17. The resulting glycol ester mixtures are used to make unsaturated polyester resins by the procedure of Example 22. The procedure of Example 26 is used to make thermosets from the resins. Properties of the resins and thermosets appear in Table V.

These examples demonstrate that unsaturated polyester resins from glycol esters of the invention give thermosets with water resistance that far exceeds that available from a comparable terephthalate resin based on diethylene glycol.

The preceding examples are meant only as illustrations; the following claims define the scope of the invention.

TABLE V

| Example | 27 | 28 | 29 | 30 | 31 | C32 |
|---|---|---|---|---|---|---|
| Formulation | | | | | | |
| Acid[1], wt. % | TA, 27.4 | ISO, 27.1 | PA, 24.9 | TA, 25.2 | TA, 19.6 | TA, 20.4 |
| maleic anhydride, wt. % | 28.2 | 27.9 | 28.8 | 29.7 | 34.7 | 30.1 |
| 2-methyl-1,3-propanediol, wt. % | 44.5 | 44.9 | 46.3 | 45.1 | 45.7 | 0 |
| diethylene glycol, wt. % | 0 | 0 | 0 | 0 | 0 | 49.5 |
| Resin Properties | | | | | | |
| Final acid # (mg KOH/g) | 8.1 | 6.1 | 8.2 | 11.2 | 15.8 | 13.6 |
| Viscosity (cps) at 35% styrene | 1710 | 1290 | 538 | 825 | 730 | 1700 |
| Mn, Mw | 2290, 6200, | 2100, 5600 | 1350, 3200 | | | |
| DTUL (°F.) | 218 | 183 | 183 | 203 | 228 | 166 |
| Thermoset Properties | | | | | | |
| Tensile strength (psi) | 9250 | 10,700 | 10,500 | 10,300 | 10,400 | 9920 |
| Tensile modulus (kpsi) | 481 | 457 | 513 | 460 | 470 | 415 |
| Elongation (%) | 2.8 | 3.9 | 4.5 | 4.4 | 3.9 | 6.9 |
| Flexural strength (kpsi), and | 21.3 | 22.3 | 22.2 | 22.1 | 20.2 | |
| % of flex strength retained after 7-day boil (water, 5% aq. KOH, 5% aq. HCl) | 80, 85, 68 | 68, 80, 57 | 74, 87, 66 | 60, 85, 67 | 75, 87, 68 | 17, 0*, 5 |
| Flexural modulus (kpsi), and | 532 | 582 | 586 | 559 | 557 | 492 |
| % of flex modulus retained after 7-day boil (water, 5% aq. KOH, 5% aq. HCl) | 98, 100, 100 | 95, 93, 92 | 90, 92, 92 | 92, 92, 90 | 92, 89, 92 | 58, 0*, 10 |

[1]TA = terephthalic acid; ISO = isophthalic acid; PA = phthalic acid. All resins made by the procedure of Example 17; all thermosets made by the procedure of Example 26.
*Sample dissolved and could not be tested.

We claim:

1. A composition which comprises:

(a) 2-methyl-1,3-propanediol; and (b) one or more glycol esters of the formula:

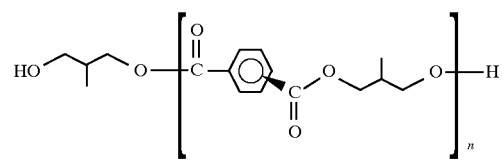

in which n has a value from 1 to 6.

2. The composition of claim 1 comprising from about 0.5 to about 50 wt. % of 2-methyl-1,3-propanediol; and from about 50 to about 99 wt. % of the glycol esters.

3. The composition of claim 1 comprising:
   (a) from about 5 to about 15 wt. % of 2-methyl-1,3-propanediol;
   (b) from about 30 to about 50 wt. % of glycol ester in which n=1; and
   (c) from about 40 to about 60 wt. % of glycol ester in which n=2 to 6.

4. A polyester resin comprising recurring units of a carboxylic acid derivative and the composition of claim 1.

5. A polyester resin comprising recurring units of a carboxylic acid derivative and the composition of claim 3.

6. A polyurethane comprising the reaction product of a di- or polyisocyanate or an isocyanate-terminated prepolymer and the composition of claim 1.

7. A polyurethane comprising the reaction product of a di- or polyisocyanate or an isocyanate-terminated prepolymer and the composition of claim 3.

8. A glycol ester composition selected from the group consisting of bis(3-hydroxy-2-methylpropyl)terephthalate and bis(3-hydroxy-2-methylpropyl)isophthalate.

9. A process for making a glycol ester mixture, said process comprising heating a phthalic acid derivative with at least about 1.5 molar equivalents of 2-methyl-1,3-propanediol and, optionally, an esterification catalyst, at a temperature within the range of about 100° C. to about 300° C.; and removing any water or alcohol of reaction to produce a mixture comprising:
   (a) 2-methyl-1,3-propanediol; and
   (b) one or more glycol esters of the formula:

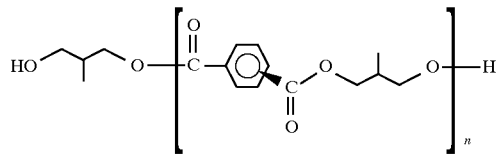

in which n has a value from 1 to 6.

10. The process of claim 9 wherein the esterification catalyst is an organotin oxide.

11. The process of claim 9 wherein the temperature is within the range of about 150° C. to about 250° C.

12. The process of claim 9 wherein the mixture comprises:
   (a) from about 5 to about 15 wt. % of 2-methyl-1,3-propanediol;
   (b) from about 30 to about 50 wt. % of glycol ester in which n=1; and
   (c) from about 40 to about 60 wt. % of glycol ester in which n=2 to 6.

13. A process for making an unsaturated polyester resin, said process comprising:
   (a) reacting a diol with at least about 2 molar equivalents of a cyclic anhydride to produce a diol diester;
   (b) heating the diol diester with the composition of claim 1, optionally in the presence of additional 2-methyl-1,3-propanediol, at a temperature within the range of about 100° C. to about 300° C. and removing water of reaction to produce an unsaturated polyester resin having a fumarate ester content as measured by $^{13}C$ NMR analysis of at least about 80 mole %.

14. The process of claim 13 wherein the diol diester has the formula:

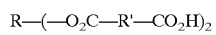

in which R is a bivalent $C_2$–$C_{30}$ alkyl or aralkyl moiety derived from the diol, and R' is a bivalent $C_2$–$C_{20}$ alkyl or aryl moiety derived from the cyclic anhydride.

* * * * *